(12) United States Patent
Walker

(10) Patent No.: US 9,701,370 B2
(45) Date of Patent: Jul. 11, 2017

(54) STRUCTURAL BLANK

(71) Applicant: STAY WILD PTY LTD, Cabarita (AU)

(72) Inventor: Guy Walker, Cabarita (AU)

(73) Assignee: Stay Wild Pty Ltd, Cabarita (AU)

( * ) Notice: Subject to any disclaimer, the term of this patent is extended or adjusted under 35 U.S.C. 154(b) by 73 days.

(21) Appl. No.: 14/415,963

(22) PCT Filed: Jul. 19, 2013

(86) PCT No.: PCT/AU2013/000805
§ 371 (c)(1),
(2) Date: Jan. 20, 2015

(87) PCT Pub. No.: WO2014/012151
PCT Pub. Date: Jan. 23, 2014

(65) Prior Publication Data
US 2015/0239533 A1 Aug. 27, 2015

(30) Foreign Application Priority Data
Jul. 20, 2012 (AU) .................................. 2012903108

(51) Int. Cl.
B63B 35/81 (2006.01)
B63B 5/24 (2006.01)
B63B 35/79 (2006.01)

(52) U.S. Cl.
CPC .......... *B63B 35/7909* (2013.01); *B63B 35/79* (2013.01); *B63B 35/7916* (2013.01); *B63B 5/24* (2013.01); *Y02T 70/143* (2013.01); *Y10T 428/18* (2015.01)

(58) Field of Classification Search
CPC . B63B 35/7909; B63B 35/7916; B63B 35/79; B63B 5/24; Y10T 428/18; Y02T 70/143
USPC ...... 428/217, 218; 441/65, 74; 114/355, 357
See application file for complete search history.

(56) References Cited

U.S. PATENT DOCUMENTS

| | | | |
|---|---|---|---|
| 3,964,354 A | 6/1976 | Johannsen | |
| 5,489,228 A | 2/1996 | Richardson et al. | |
| 5,514,017 A | 5/1996 | Chimiak | |
| 5,647,784 A * | 7/1997 | Moran | B63B 35/7906 114/357 |
| 6,030,483 A * | 2/2000 | Wilson | B32B 3/12 156/290 |
| 6,167,790 B1 | 1/2001 | Bambara et al. | |

(Continued)

FOREIGN PATENT DOCUMENTS

| | | |
|---|---|---|
| EP | 0038091 A1 | 10/1981 |
| WO | 9729011 | 8/1997 |

OTHER PUBLICATIONS

International Search Report and Written Opinion for PCT/AU2013/000805 mailed Sep. 4, 2013, 12 pages.

*Primary Examiner* — Anthony Wiest
(74) *Attorney, Agent, or Firm* — Shaukat A. Karjeker; Carstens & Cahoon, LLP

(57) ABSTRACT

A structural blank suitable for a watercraft is described. At least part of the structural blank comprises a plurality of structural elements connected to adjacent structural elements so that the plurality of structural elements are arranged in a matrix of structural elements forming at least a portion of the structural blank.

17 Claims, 25 Drawing Sheets

(56) References Cited

U.S. PATENT DOCUMENTS

2007/0131346 A1\* 6/2007 Krafft ............... B29C 43/003
 156/250
2008/0014809 A1 1/2008 Brown et al.
2009/0011667 A1\* 1/2009 Hayward ............ B63B 35/7909
 441/74

\* cited by examiner

STRUCTURAL BLANK

FIELD OF THE INVENTION

The present invention relates generally to a structural blank suitable for use in watercraft structures such as for example boards including surfboards, stand-up paddleboards, bodyboards, kneeboards, skimboards, kiteboards, wakeboards, as well as skiffs, yachts and powerboats. Embodiments of the present invention also generally relate to the boards themselves, and are also effective when applied to skateboards, landboards, toboggans, and other craft.

BACKGROUND OF THE INVENTION

It is known to produce watercraft such as surfboards with a blank comprising two half-pieces separated by a longitudinally-extending, centrally-disposed stringer. The pieces and stringer are glued together to form the blank and the board is then shaped, coated with fibreglass matting and resin.

Other known structures have inherent difficulties delivering strength, toughness and/or a predictable or useful flexibility.

The present invention provides a new structural blank.

The present invention also provides a new board constructed from a new structural blank.

SUMMARY OF THE INVENTION

In accordance with one aspect of the present invention there is provided a structural blank suitable for a watercraft, wherein at least a portion of the structural blank comprises a plurality of structural elements, each one of the plurality of structural elements connected to one or more adjacent structural elements so that the plurality of structural elements in the portion of the structural blank are arranged into a matrix of structural elements.

The arrangement is such that at least the portion, or the entirety, of the structural blank comprising a plurality of structural elements may comprise structural elements which are regular or irregular and thus are distributed in a regular or irregular matrix to form a tessellation to form the structural blank portion or whole tessellated structural blank.

Optionally there is provided one type of structural element, each type of structural element having features generally like other elements in the one type. Optionally there is provided a plurality of different types of structural element in the tessellated portion or whole tessellated structural blank, each type of structural element differing from other types in one or more selected characteristics. For example, some types of structural element may differ in shape relative to other types of structural elements, while other structural elements may differ in density, rigidity, colour, opacity or material.

Preferably each one of the structural elements are uniform in depth. The arrangement is preferably such that, when disposed in the tessellated portion of the blank or tessellated blank, the edges of each structural element abut the edges of adjacent structural elements.

Preferably the structural elements are in the form of tiles.

Preferably one type of structural element is of regular plan-view shape and extruded so as to be a regular prism. One type of regular plan-view structural element prism is a hexagonal prism. Other optional types of structural element may include, in plan view and extruded: octagons; and/or squares; and/or rectangles; and/or pentagons; and/or dodecahedrons; and/or diamonds; and/or rhombus; and/or parallelograms; and/or circles; and/or ovals; and/or double convexes and the like.

Where the regular shape does not allow for full contact between adjacent sides of the structural elements, such as for example in the case of a regular octagon, a different type of structural element, of a different plan-view prism shape, may be employed in the gap so that a generally contiguous blank may be formed. The arrangement in those situations may be in the form of, for example, octagon-and-dot, or other suitable distributed arrangement of regular prism shapes.

Optionally the regular distribution is such that there is a repeating pattern or repeating tessellation formed across the tessellated portion of the structural blank or across the whole of the structural blank.

Preferably the types of structural elements vary in density so that one type of structural element is of a selected density and another type of structural element is of another selected density. Preferably there are up to four different types of structural element of varying densities which may be used in one blank: a first density, designated as Super Lite density, which has a density of about 13.5 kg/m3 (or a selected density in a range of about 10-20 kg/m3), a Medium density, which has a density of about 19 kg/m3 (or a selected suitable density in a range of about 15-25 kg/m3); a third type of structural element designated as Hard, having a density of about 23 kg/m3; Very Hard, having a density of about 28 kg/m3 (or any selected suitable density in a range of about 25-40 kg/m3). The densities just mentioned above are examples of densities that work well together for a surfboard material and other densities are contemplated as being effective, and those densities are in the range of about 0.5 kg/m3 to about 100 kg/m3. Higher densities in that range or even beyond it are more useful for sailing watercraft and powerboats, which are designed to take very high rigging loads and wave loads, as well as propulsion loads.

In one preferred embodiment, being a surfboard, the material of each structural element is Expanded Polystyrene foam (EPS) which to form into a finished board is glassed with epoxy resin.

In an alternative embodiment, being a different kind of surfboard, the material of each structural element is polyurethane foam which to form into a finished board is glassed with polyester resin.

Several different types of structural element are contemplated such that each type is a different size relative to other types. For example, in one preferred embodiment of the present invention, being a surfboard blank, each one of the structural elements is a hexagon and varies in size. Some example contemplated sizes are such that the diameter (the distance from a vertex on one side of the structural element to a vertex on the other side of the structural element across the centre of the hexagonal structural element) is 75 mm, or 120 mm, or 150 mm, or 175 mm, or 200 mm, or 250 mm, or 300 mm, or 350 mm. Smaller-diameter hexagons are more likely to give a stiffer feel to a surfboard when ridden, whereas larger hexagons are likely to give a looser feel to the surfboard when ridden.

It may be possible to include different sizes of the same shape of structural element in the tessellated blank portion, or tessellated whole blank (simple examples are where the structural elements are square, or rectangular).

Some irregular shapes are contemplated as being effective, including jigsaw pieces, wherein one element of one structural element interlocks with another. Mortise and tenon joints are contemplated as being effective, as are dovetail joints, biscuit joints, dowelled joints, lap joints, and others.

Preferably the joints between each adjacent structural element in the tessellated blank portion or tessellated blank are butt joints and are adhered to one another with adhesive. Preferably the adhesive is suitable for bonding to faces of EPS and one example of a suitable adhesive for that purpose is polyurethane adhesive. One suitable adhesive is AVS510 adhesive and another is 1831 PU adhesive.

Preferred embodiments of the present invention include a tessellated structural blank comprising three different densities of structural element. A plurality of Very Hard or high density elements are disposed in a foot-support region, near the mid-back region of a blank. Medium dense elements are disposed around the Very hard elements, and Super Light structural elements are disposed at ends or edges of the blank to provide volume and flex, and other properties for speed and manoeuvrability.

Other preferred embodiments include a plurality of Very Hard structural elements arranged in an X-shape. Medium structural elements are disposed between the arms of the X-shape and Super Light elements are disposed at one or more ends.

In some embodiments the tessellations do not extend across the whole of the blank. In some embodiments there is a tessellated portion which extends across only a portion of the board, while the remainder of the board can be a solid blank portion or a plurality of elongate plates of differing shapes, but cooperate along the tessellated interface.

It can be seen that, advantageously, various combinations of densities can be deployed and distributed across a board in accordance with a preferred embodiment of the present invention in varying ways in order to create a board with a selectable and suitable flex signature. Volume and flex can both be packed into parts of a board where previously this combination of features was not possible.

To manufacture the structural blank, a plurality of tiles may be assembled so as to abut or interconnect with adjacent tiles. A customised flex signature may be provided by the arrangement of various types of tiles having different densities. The tiles may then be glued together to form a blank. The blank may then be shaped by a shaper's cutting, sanding, hollowing, or other method to form a suitable board of a suitable performance characteristic, tuned for speed, stability, or manoeuvrability, or flex. Fibreglass matting and resin and fin boxes are then applied and installed.

To manufacture several structural blanks at once, all having the same flex performance characteristic, a plurality of selected pylons of various types of structural elements are placed alongside one another and glued together. For example, a hexagonal-cross-section pylon would be connected to another similarly-shaped pylon and so on to form a very thick, say 1 m high, blank, about 2.5 m long and about 1m wide (say). Some structural elements would be of density different to others so as to provide a selected flex performance characteristic. The pylon block blank thus assembled can be thought of as a tile blank, just very thick. Once a pylon block has been assembled this way, a plurality of sheets or plates of blank can be sliced from the block to form glued-together blanks as thick as a tile, say, 100 mm thick, which can then be shaped to form a board in conventional ways.

Some of the structural elements may be cut into their final plan shape from a sheet but preferably each element is moulded specifically into it selected plan shape so as to be immediately assembled into its tessellated blank portion or tessellated blank.

BRIEF DESCRIPTION OF THE DRAWINGS

In order to enable a clearer understanding, the invention will now be further explained and illustrated by reference to preferred embodiments set out in the accompanying drawings, in which.

DEFINITIONS

Figure 1:
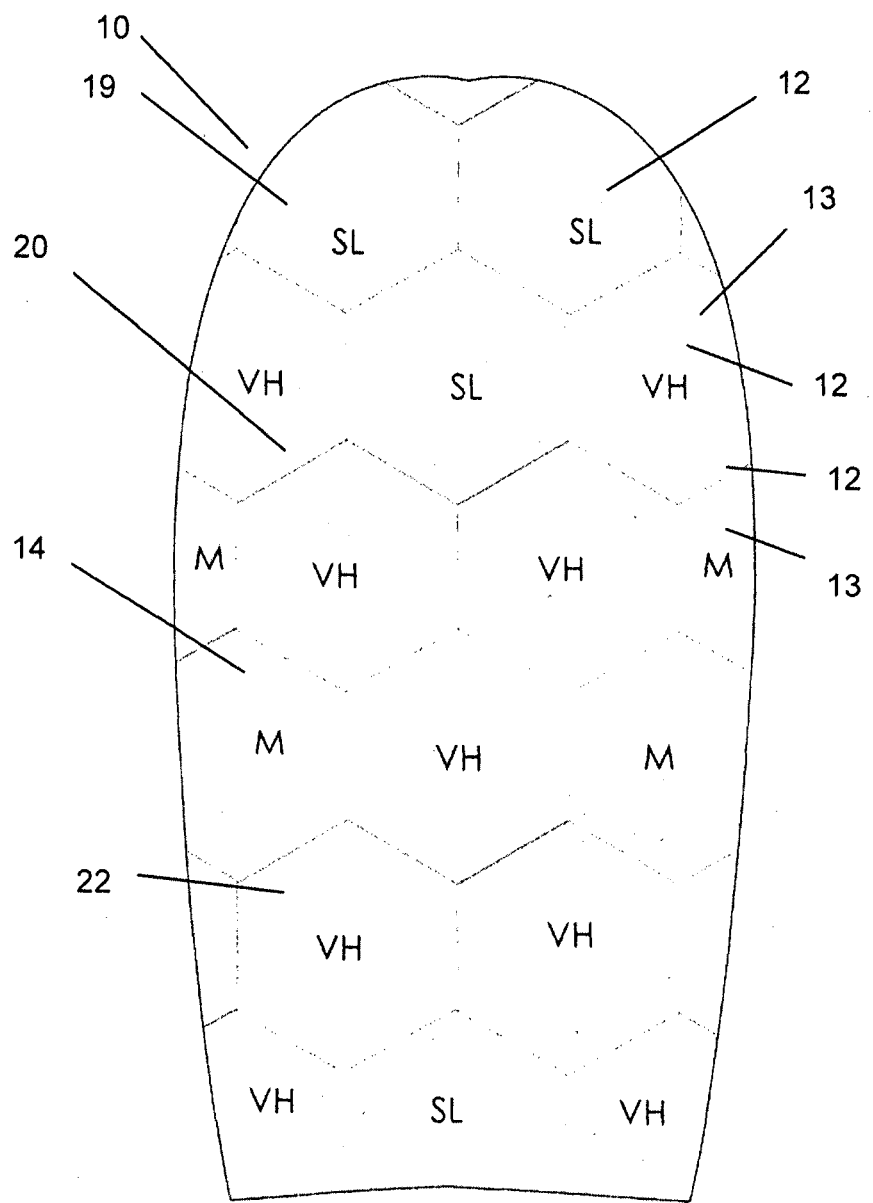
FIG. 1 is a plan view of a body board blank in accordance with a preferred embodiment of the present invention, the blank being fully tessellated and including tiles of various densities but each one of the same initial shape as the others.

Throughout this specification and the claims that follow, density is to be taken as to mean mass per unit of volume (eg g/m3 in SI units).

In this specification, where a document, act or item of knowledge is referred to or discussed, this reference or discussion is not an admission that the document, act or item of knowledge or any combination thereof was at the priority date:
  (a) part of common general knowledge; or
  (b) known to be relevant to an attempt to solve any problem with which this specification is concerned.

The word 'comprising' and forms of the word 'comprising' as used in this description and claims do not limit the invention claimed to exclude any variants or additions.

DETAILED DESCRIPTION OF A PREFERRED EMBODIMENT

Referring to the drawings there is shown a structural blank suitable for a watercraft, the structural blank generally indicated at 10 and comprising a plurality of structural elements 12, each structural element connected to adjacent structural elements so that the plurality of structural elements are disposed in a regular matrix 14 of structural elements 12 distributed across the structural blank 10.

The arrangement shown in FIG. 1 is such that the plurality of structural elements 12 is arranged in a regular pattern or tessellation 16 across the structural blank 10.

There are provided three types of structural element 12, each type having a different density from other types of elements but each one being at least initially (that is, before being shaped into a board), of the same shape as each one of the others.

The structural elements 12 are uniform in depth 18 so as to form regular prisms 13 of uniform depth 18 in the form of tiles 20 and as such the arrangement is such that, when disposed in the blank, the edges 19 of each structural element 12 abut the edges of adjacent structural elements 12.

Each structural element 12 is of regular shape, the shape being hexagonal prisms 22.

As mentioned above, the types of structural elements 12 have densities that are different between types, so that one type of structural element is of a selected density and another type of structural element is of another selected density. There are four different types of structural element of varying densities shown in the Figures, three of which are shown as being used in one blank: designated as Super Light density (shown as SL in the drawings), which in the example embodiment shown in the Figures has a density of 13.5 kg/m$^3$ (or a selected density in a range of about 10-20 kg/m3), a Medium (M in the drawings) density, which in the example shown in the Drawings has a density of 19 kg/m$^3$ (or a selected suitable density in a range of about 15-25 kg/m3) a third type of structural element designated as Hard (H in the drawings), having a density of about 23 kg/m3 (or any suitable density in a range of about 18-27 kg/m3); and a fourth density being Very Hard (VH in the drawings), having a density of 28 kg/m$^3$ (or any selected suitable density in a range of about 25-40 kg/m3).

The densities just mentioned above are examples of densities that work well together for a surfboard material and other densities are contemplated as being effective, and those densities are in the range of about 0.5 kg/m3 to about 100 kg/m3. Higher densities in that range or even beyond it are more useful for sailing watercraft and powerboats, which are designed to take very high rigging loads and wave loads, as well as propulsion loads.

In the embodiments shown in the drawings, being boards, the tiles 13 are made of EPS, or Expanded Polystyrene foam.

Figure 2:
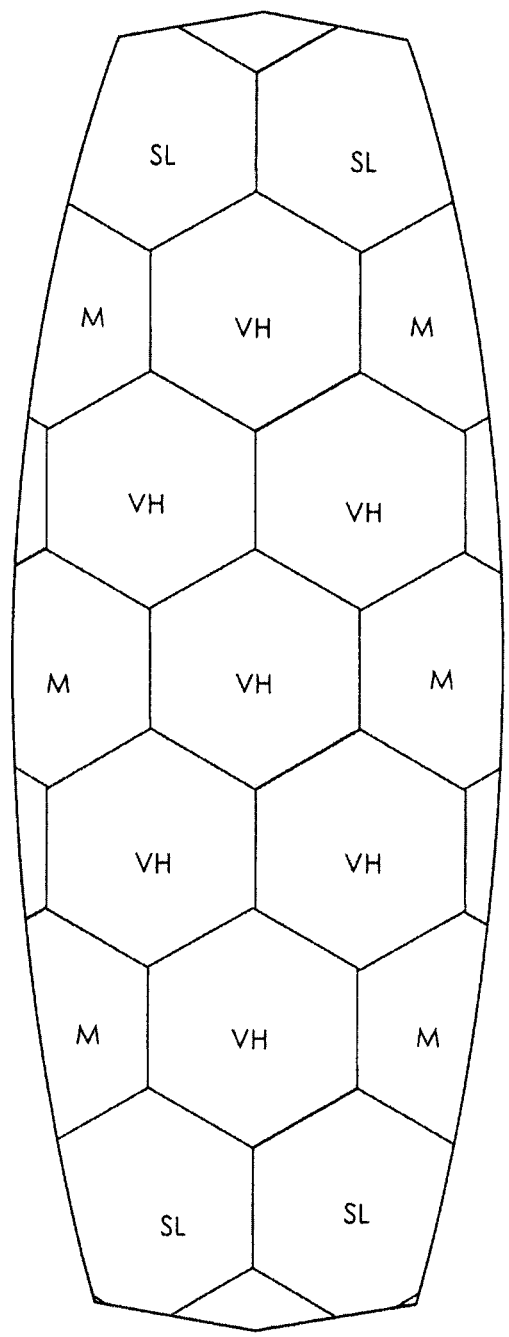
FIG. 2 is a plan view of a kite board blank in accordance with a preferred embodiment of the present invention the blank being fully tessellated and including tiles of various densities but each one of the same initial shape as the others, a central spinal region comprising Very Hard tiles to stiffen the board against bending.
Figure 3:
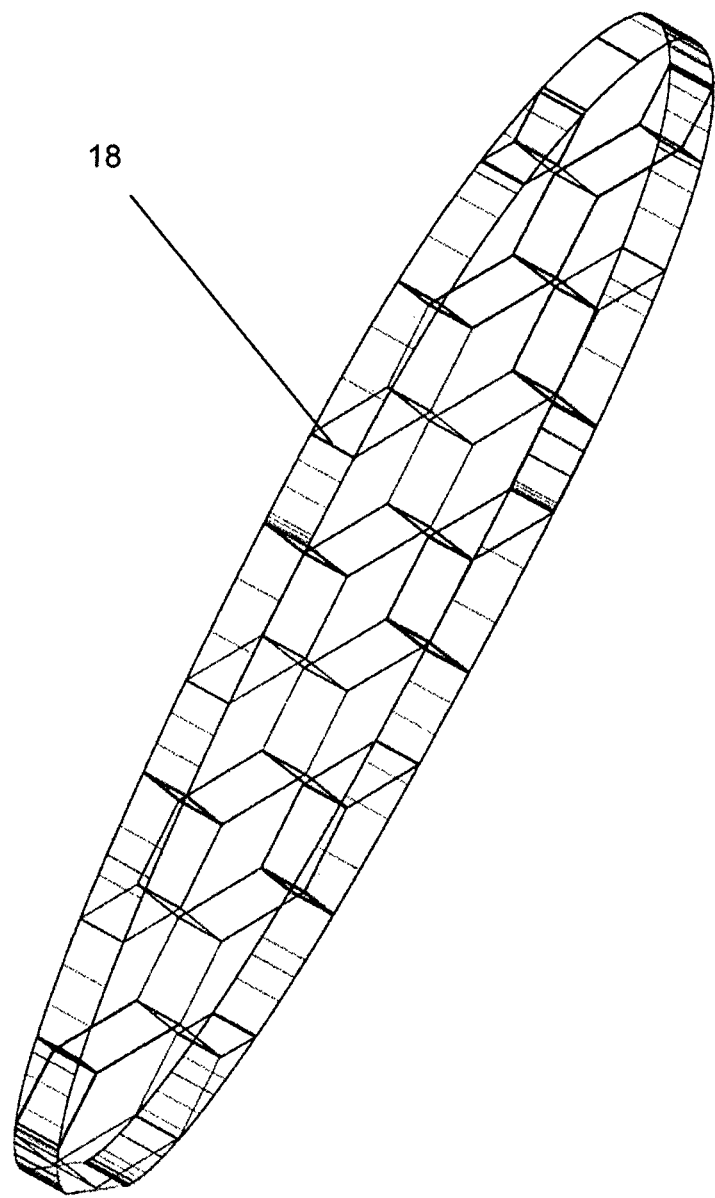
FIG. 3 is an isometric view of a surf board blank in accordance with a preferred embodiment of the present invention the blank being fully tessellated and including tiles of various densities but each one of the same initial shape as the others.

Several different types of structural element are shown in terms of varying sizes. For example, in one preferred embodiment, being the kiteboard in FIG. 2, the hexagons are intended to be about 150 mm from opposed vertex to opposed vertex, through the centre of the tile (dimension X in FIG. 5). For the longboard shown in FIG. 6, the tiles are intended to be about 300 mm. For the snowboard in FIG. 7, the tiles are intended to be about 175-200 mm in size. For the surfboard shown in FIG. 9, the tiles are intended to be about 350 mm. Smaller hexagons are more likely to give a stiffer feel, whereas larger hexagons are likely to give a looser feel.

Figure 5:
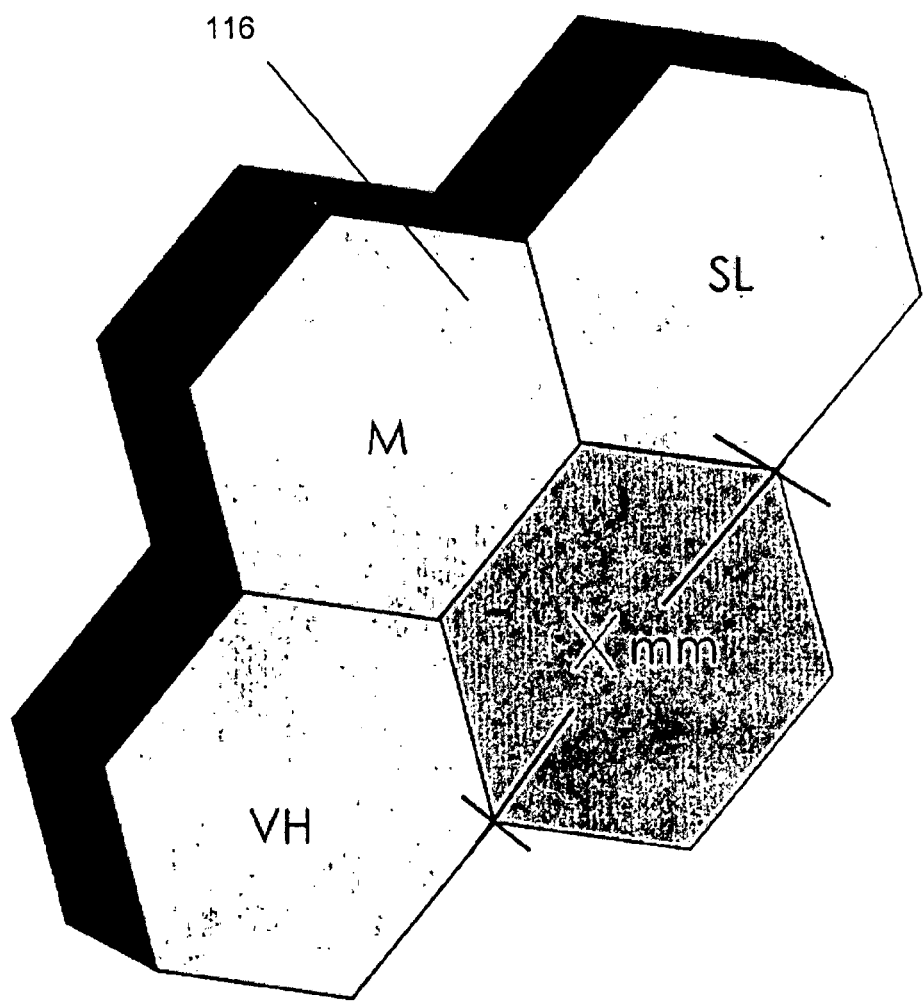
FIG. 5 is a detail isometric view showing several tiles of varying densities in accordance with components of a preferred embodiment of the present invention, each tile being of the same initial shape as adjacent other tiles.
Figure 6:
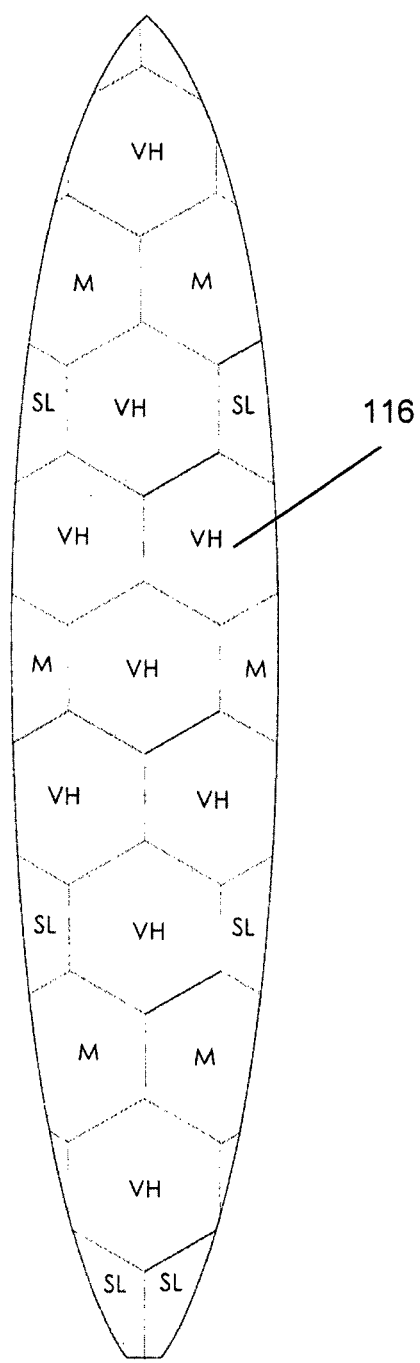
FIG. 6 is a plan view of a long board in accordance with a preferred embodiment of the present invention the blank being fully tessellated and including tiles of various densities but each one of the same initial shape as the others and having a density distribution similar to that shown in FIGS. 1 and 4 for strong spine, tail flex, and roll flex.

Generally, for the surfboards and some other boards shown in the Figures, it is contemplated that the most common and most suitable size for flexibility manipulation (being a characteristic of preferred embodiments of the present invention) is approximately 200 mm between opposed vertices (dimension X in FIG. 5).

The joints between each tile 20 are butt joints and are adhered to one another with adhesive to connect to one another. The adhesive is suitable for bonding to faces of EPS and one example of a suitable adhesive for that purpose is Polyurethane.

Figure 8:
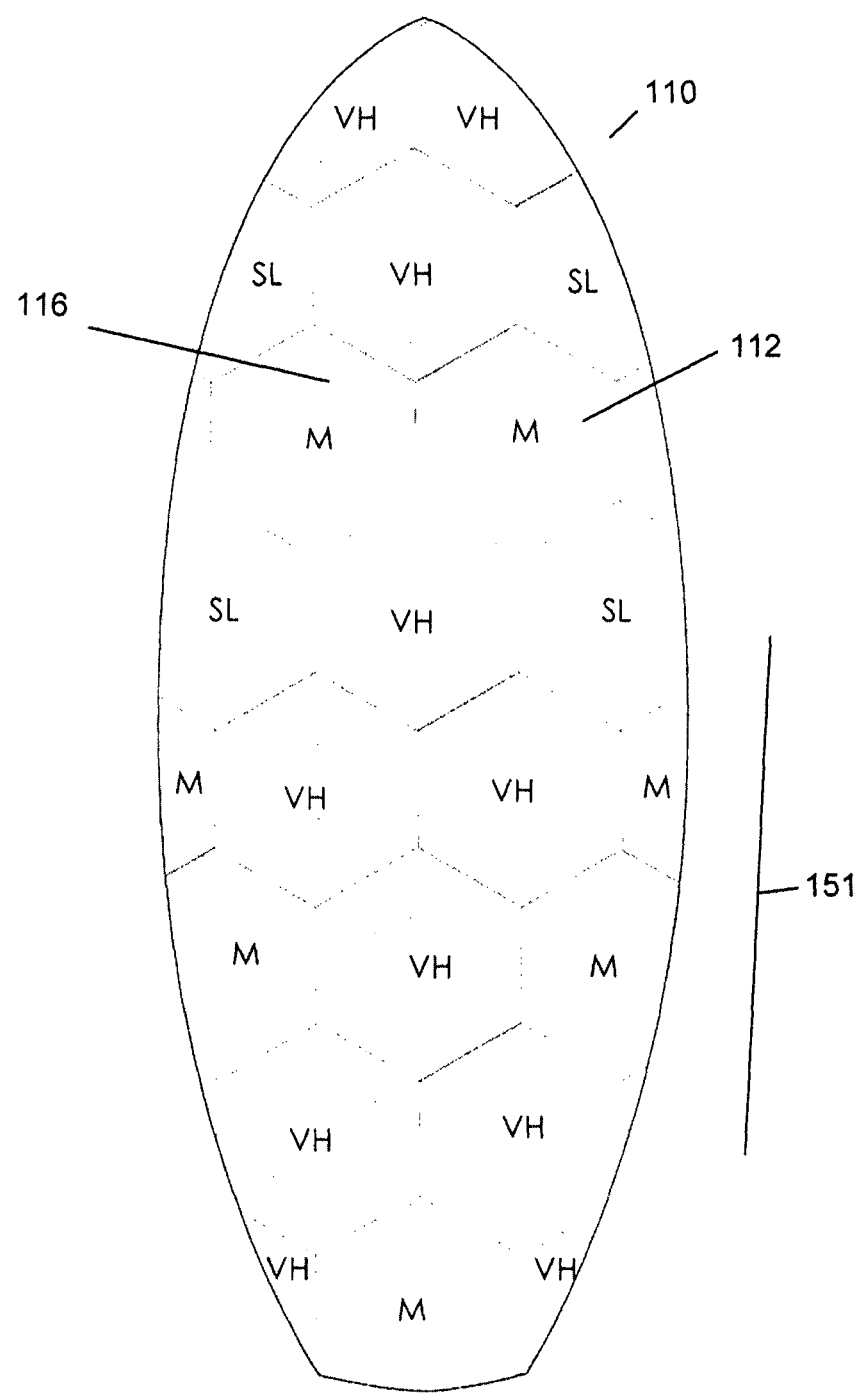
FIG. 8 is a plan view of a skim board in accordance with a preferred embodiment of the present invention the blank being fully tessellated and including tiles of various densities but each one of the same initial shape as the others, the density distribution of the tiles being such that Very Hard tiles are disposed in a central and rear region for foot support, and a generally lighter forward region.

As discussed above, the embodiments of the present invention include a structural blank 10 comprising three different densities of structural element 12. A plurality of Very Hard or high density elements are disposed in a foot-support region 151, near the mid-back region of a blank, as shown in FIG. 8. Medium density (as hereindefined) elements are disposed around the Very hard (as hereindefined) elements, and Super Light (as hereindefined) structural elements are disposed at ends or edges of the blank to provide volume and flex, and other properties for speed and manoeuvrability.

Figure 4:
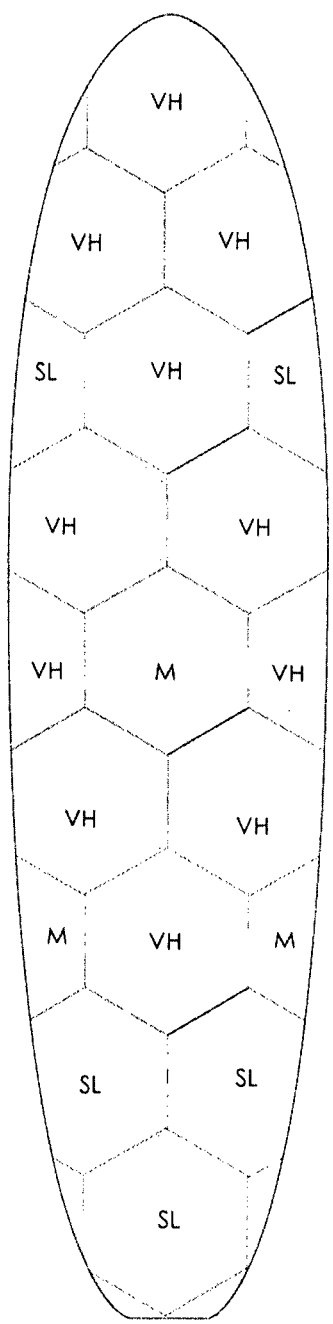
FIG. 4 is a plan view of a surf board blank in accordance with a preferred embodiment of the present invention the blank being fully tessellated and including tiles of various densities but each one of the same initial shape as the others, the arrangement of the densities of the tiles being such that the footpad regions comprise Very Hard tiles, to reinforce those areas, while the tail area has light to provide that area with release and flex and some central and edge regions comprise lower density tiles for slight roll flex.
Figure 7:
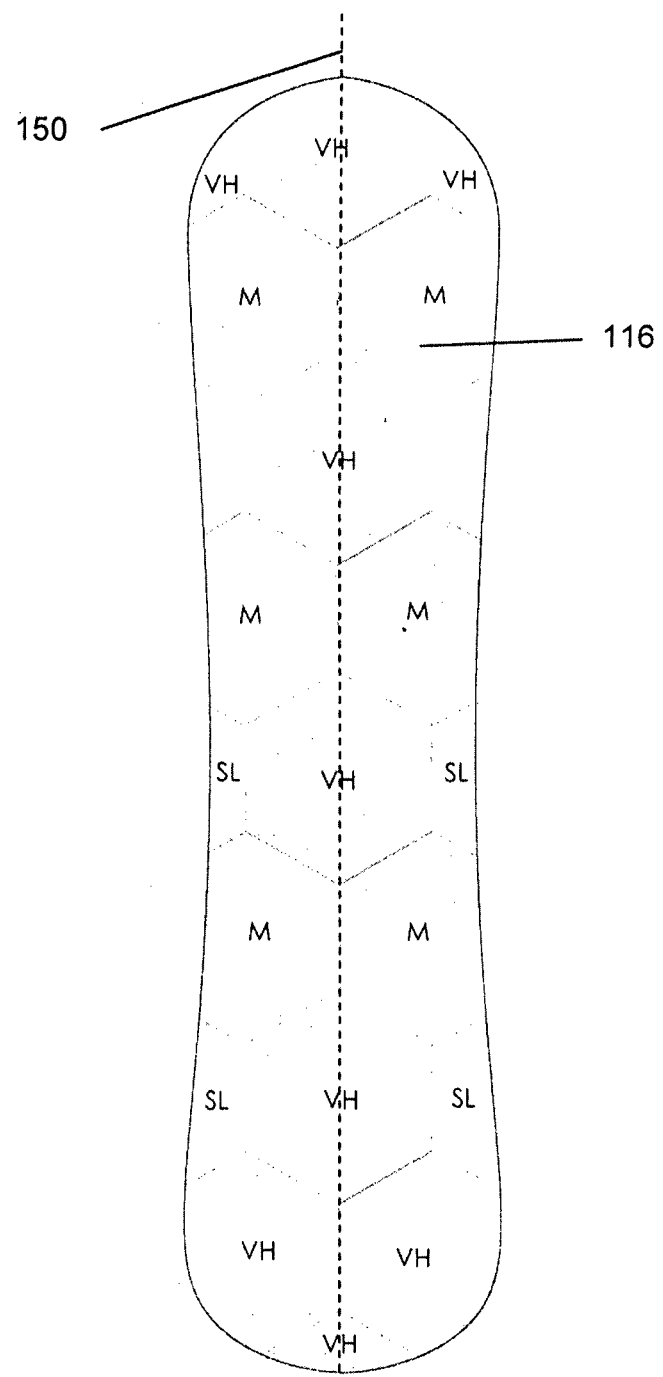
FIG. 7 is a plan view of a snow board in accordance with a preferred embodiment of the present invention the blank being fully tessellated and including tiles of various densities but each one of the same initial shape as the others, the density distribution being Very Hard at the ends and the central regions having less dense tiles, for increased twist and bending in middle sections as is useful for high performance in snowboards and other boards.

In FIGS. 4 and 7 the structural elements are arranged so that a plurality of Very Hard structural elements are disposed substantially adjacent or along a centreline 150 of the blank to provide a strong spine resistant to bending but allowing some twist.

Figure 9:
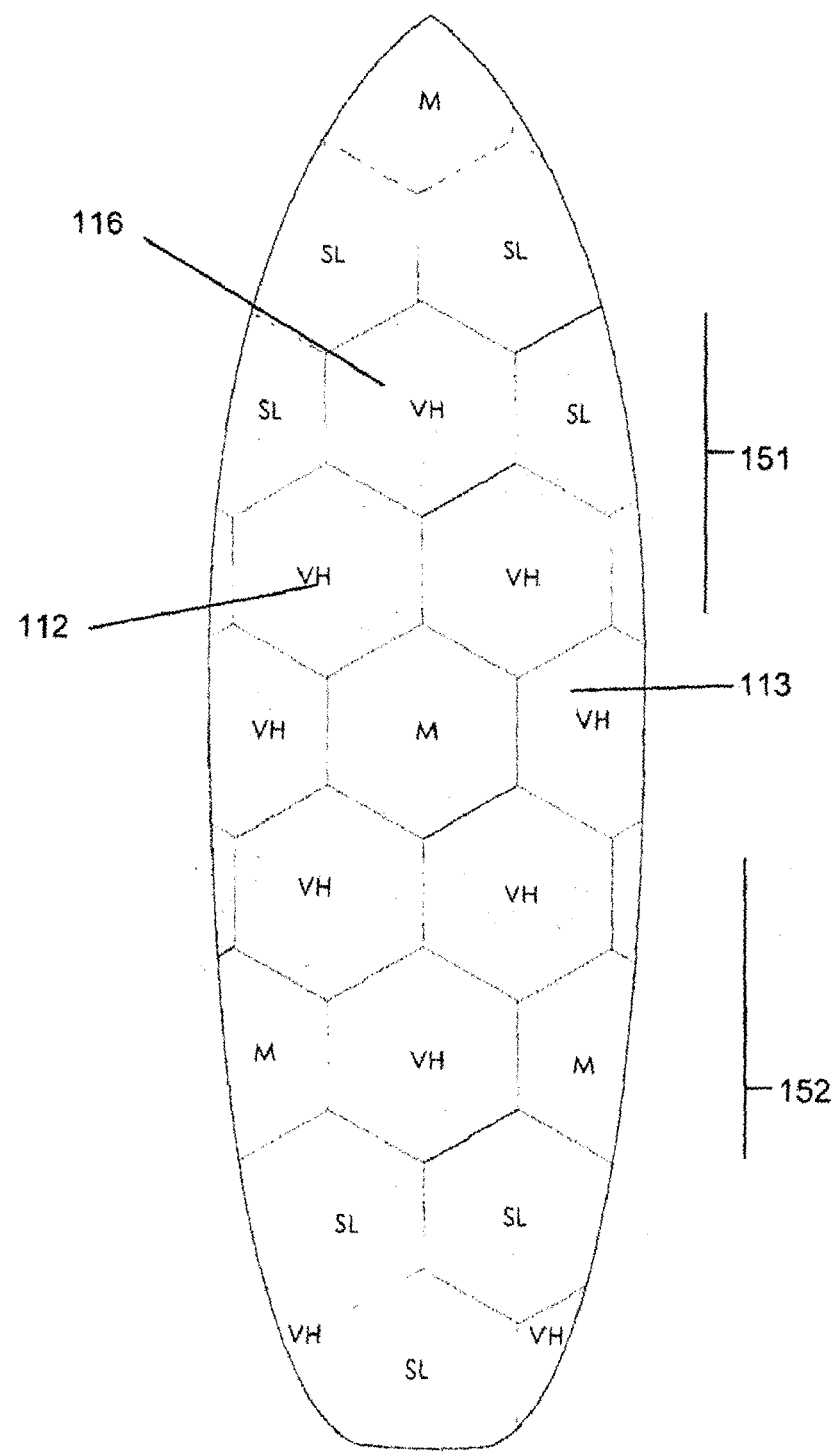
FIG. 9 is a plan view of a surf board in accordance with a preferred embodiment of the present invention the blank being fully tessellated and including tiles of various densities but each one of the same initial shape as the others, the density distribution of the tiles being similar to FIG. 4 for similar flex and foot support performance.
Figure 10:
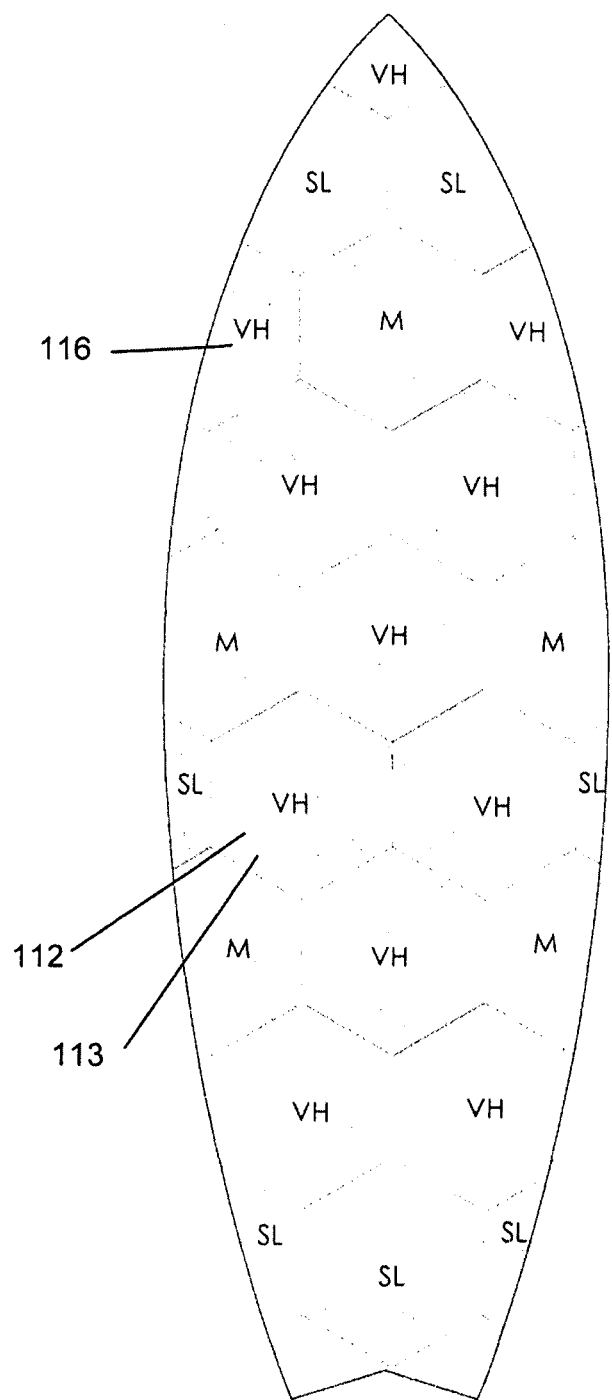
FIG. 10 is a plan view of a paddle board in accordance with a preferred embodiment of the present invention the blank being fully tessellated and including tiles of various densities but each one of the same initial shape as the others, the density distribution being such that a central region, offset towards a rear of the blank, comprises mainly Very Hard tiles for stiff flex response and edges, nose and tail comprise lighter density tiles.
Figure 11:
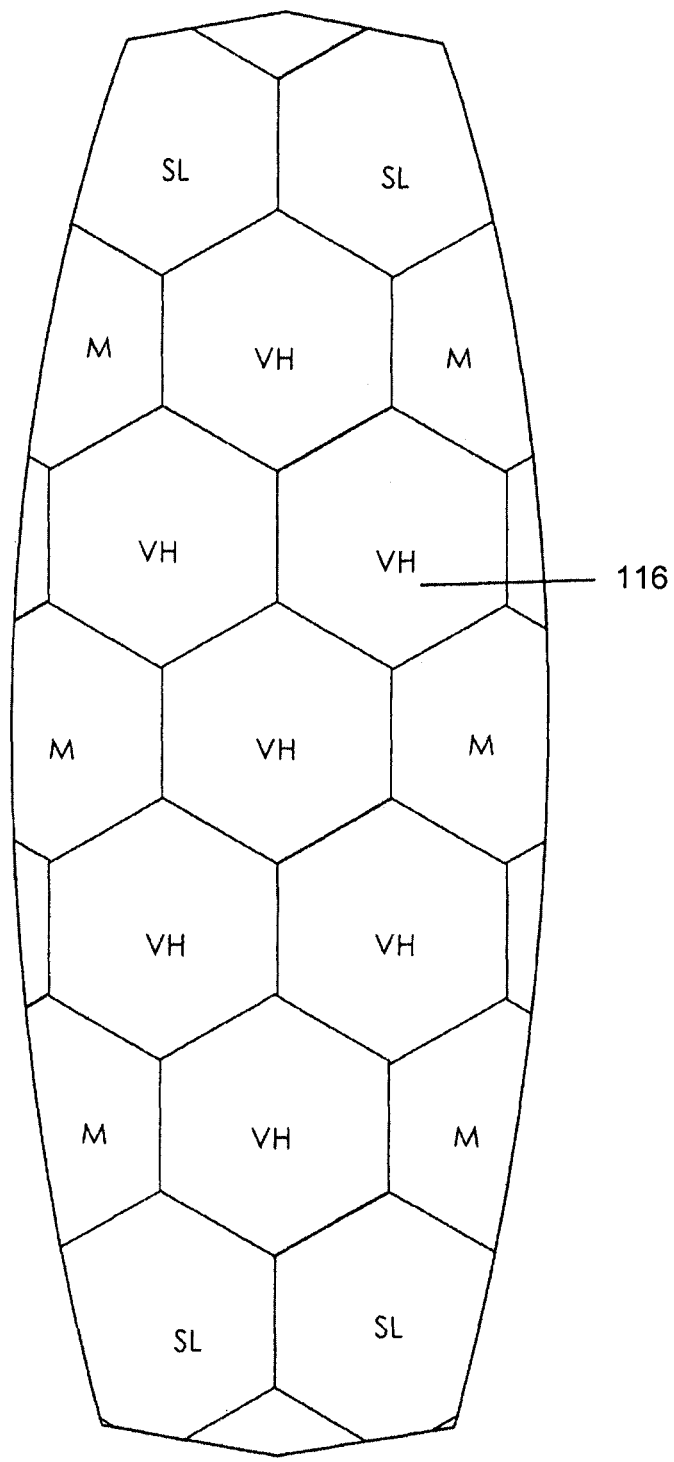
FIG. 11 is a plan view of a wake board in accordance with a preferred embodiment of the present invention the blank being fully tessellated and including tiles of various densities but each one of the same initial shape as the others.
Figure 12:
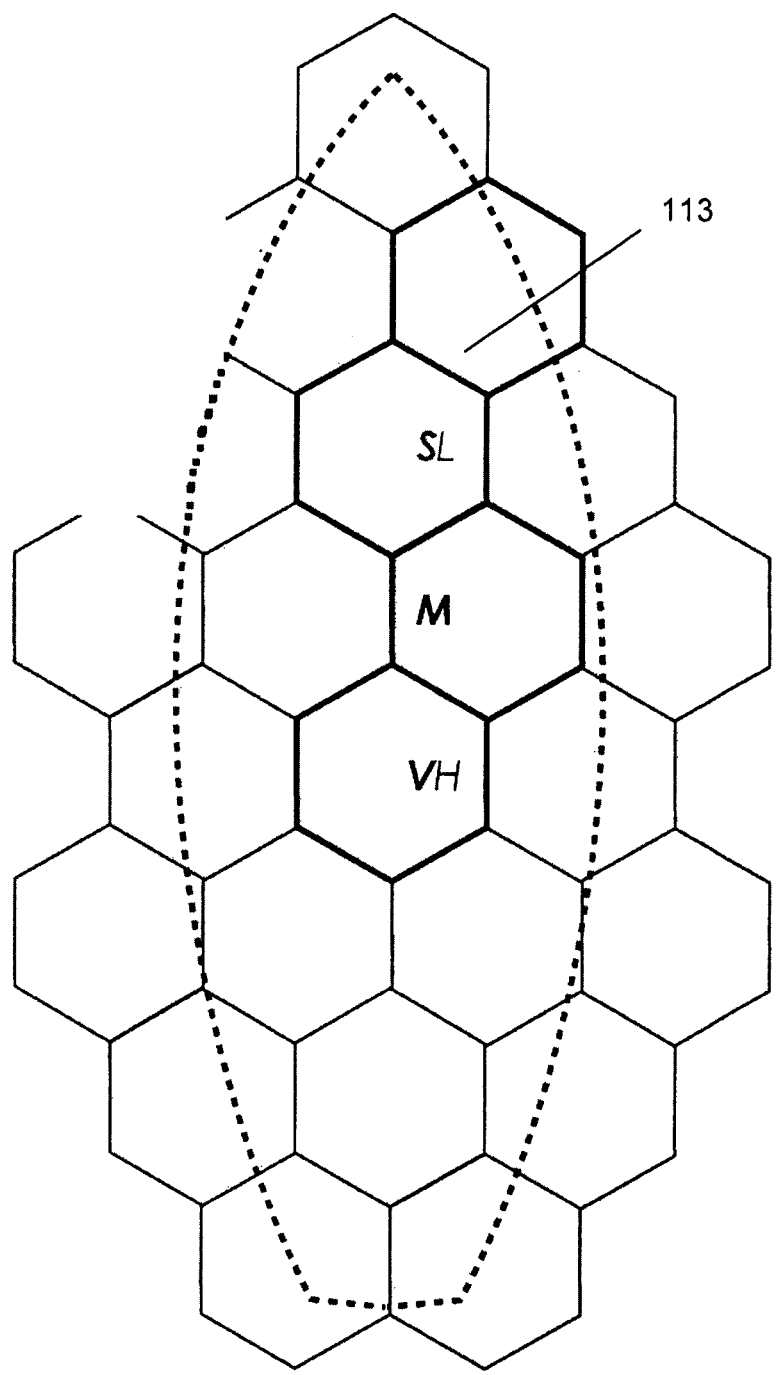
FIG. 12 is a plan view of a structural blank with construction lines placed thereon to indicate cutting lines, the blank being in accordance with a preferred embodiment of the present invention and the blank being fully tessellated and including tiles of various densities but each one of the same initial shape as the others.

In FIG. 9 the structural elements of tessellated portion 116 are arranged so that a plurality of Very Hard structural elements are disposed in discrete groups adjacent foot support areas 151 on the blank.

Figure 13:
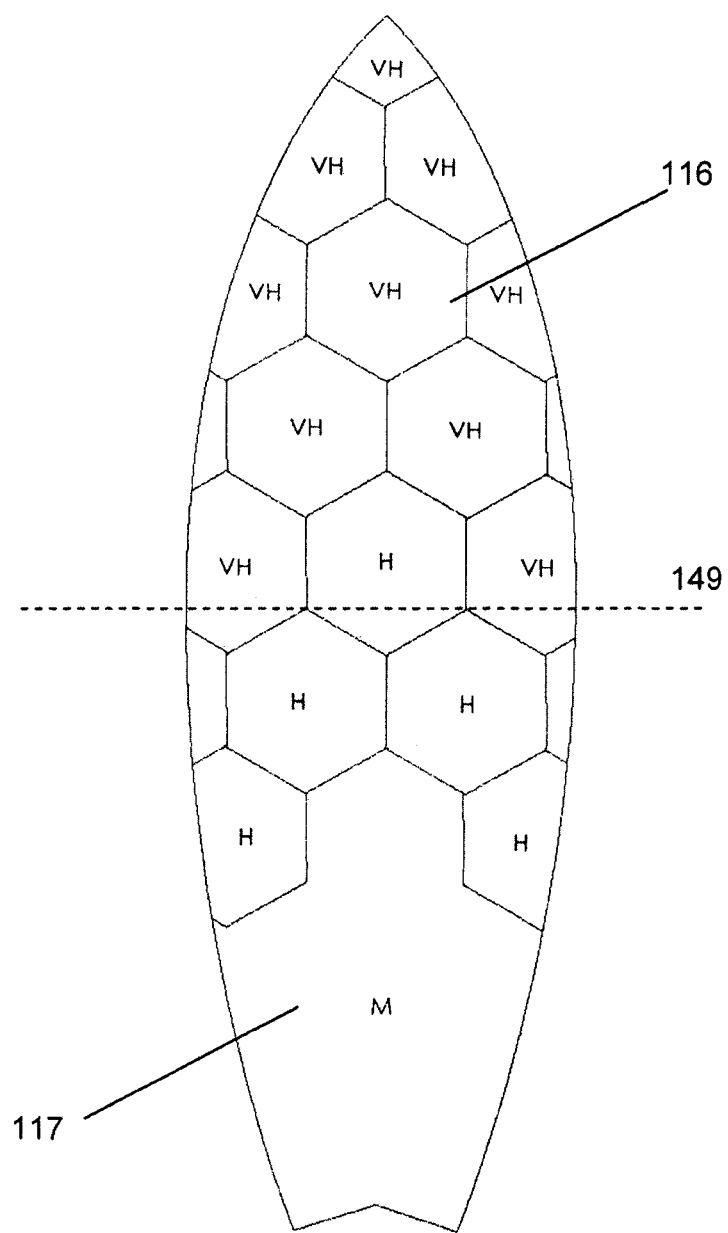
FIG. 13 is a plan view of a surfboard blank in accordance with a preferred embodiment of the present invention, the blank comprising a tessellated portion including tiles of various densities but each one being the same initial shape as the others, and a solid plate portion disposed aft of a midline for a selected greater tail flex.
Figure 14:
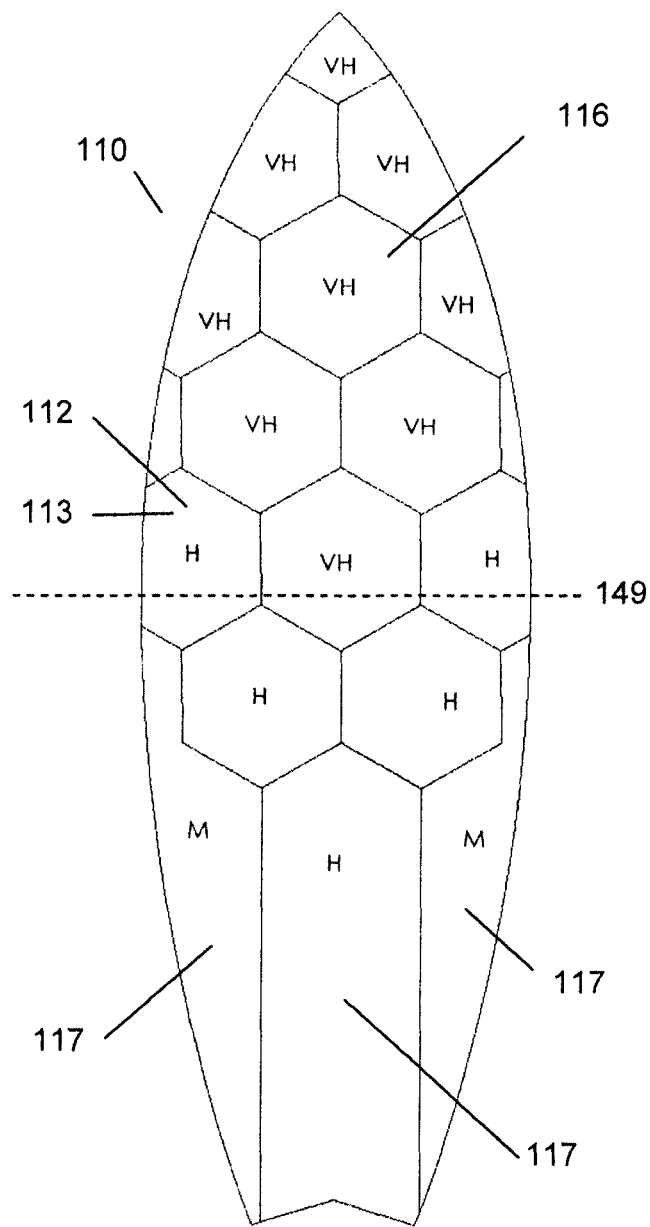
FIG. 14 is a plan view of a surfboard blank in accordance with a preferred embodiment of the present invention, the blank comprising a tessellated portion including tiles of various densities but each one being the same initial shape as the others, and a solid plate portion comprising a plurality of solid plates disposed aft of a midline.

In FIGS. 13 and 14 the structural elements are arranged to form a tessellated region so that a plurality of Very Hard and hard structural elements 116 are disposed adjacent one another in a group generally adjacent and forward a transverse midline 149 on the blank 110.

Figure 15:
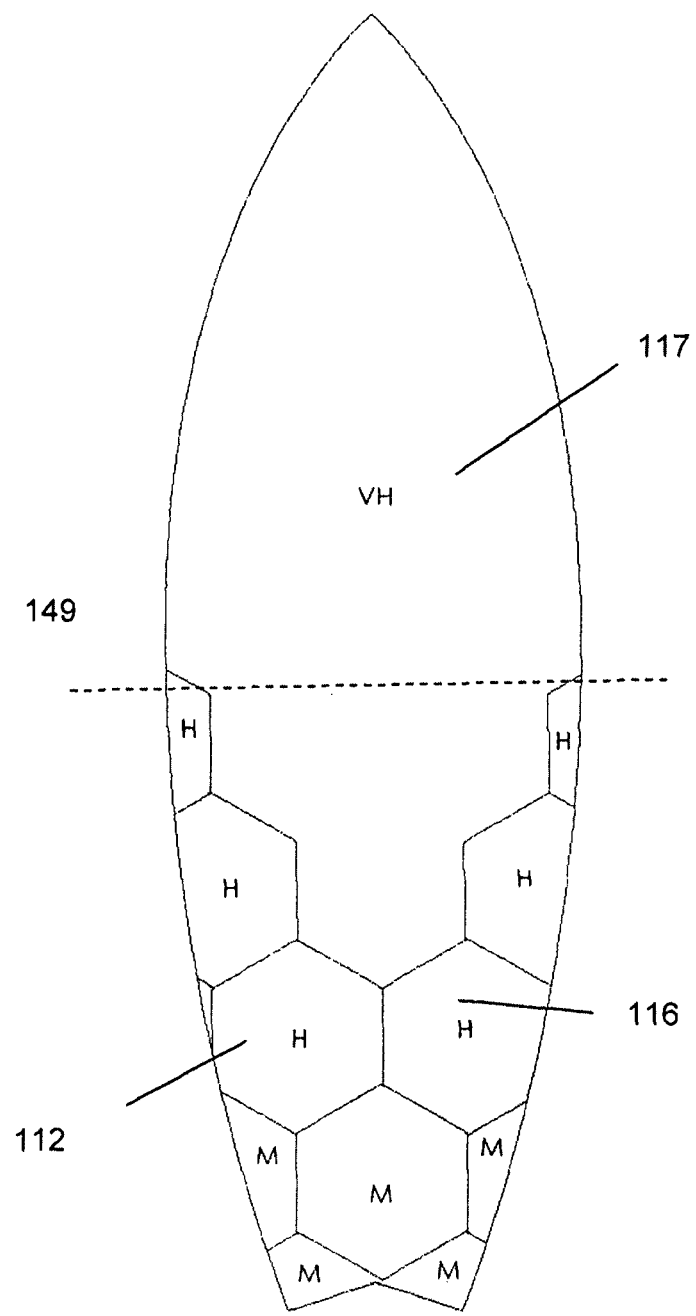
FIG. 15 is a plan view of a surfboard blank in accordance with a preferred embodiment of the present invention, the blank comprising a tessellated portion including tiles of various densities but each one being the same initial shape as the others, and a solid plate portion disposed in a front region of the surfboard blank.

In FIG. 15 the structural elements are arranged so that a single Very Hard structural element plate 117 is disposed generally forward of a transverse midline on the blank, and a plurality of structural tile elements 116 are disposed aft or adjacent the transverse midline. This provides a selected twist signature, having a selected rigidity and selectable twist at the rear portion, while the front is freer to flex, depending on the density of that plate 117, which can be varied.

In the blanks shown in FIGS. 13 to 17, the tessellations do not extend across the whole of the blank. There is a tessellated portion 116 which extends across only a portion of the board. The remainder of the board is a solid blank portion 117 (FIGS. 13, 15).

Figure 16:
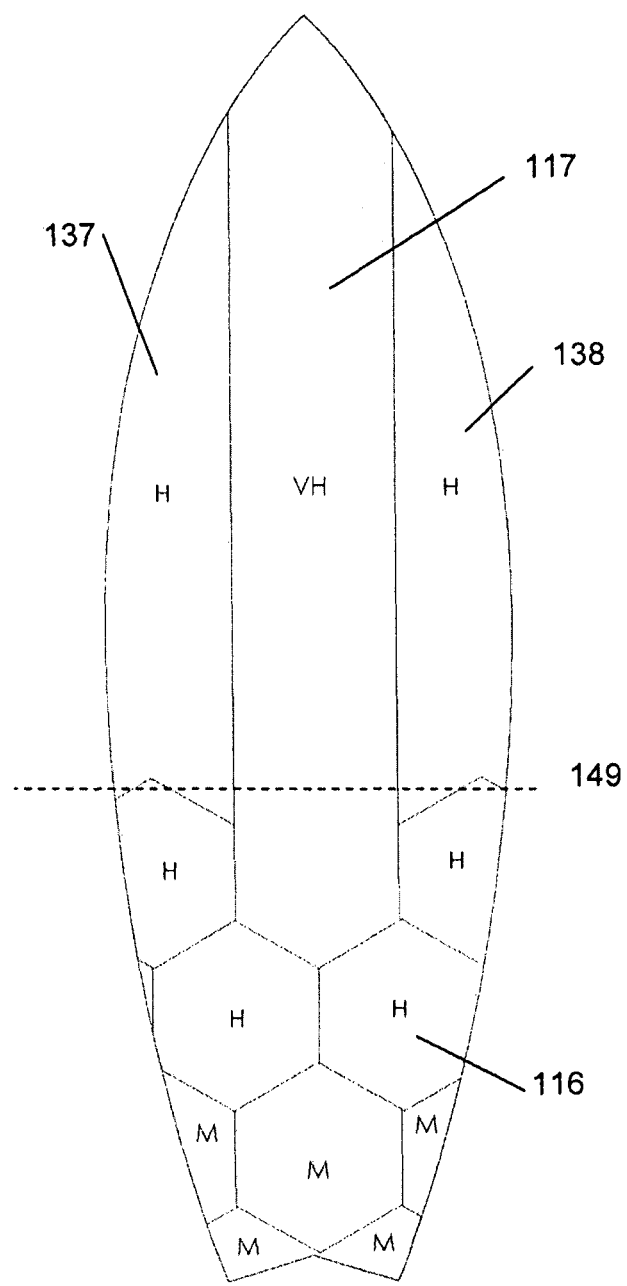
FIG. 16 is a plan view of a surfboard blank in accordance with a preferred embodiment of the present invention, the blank comprising a tessellated portion including tiles of various densities but each one being the same initial shape as the others, and a solid portion comprising a plurality of solid elongate plates disposed forward of a transverse midline.
Figure 17:
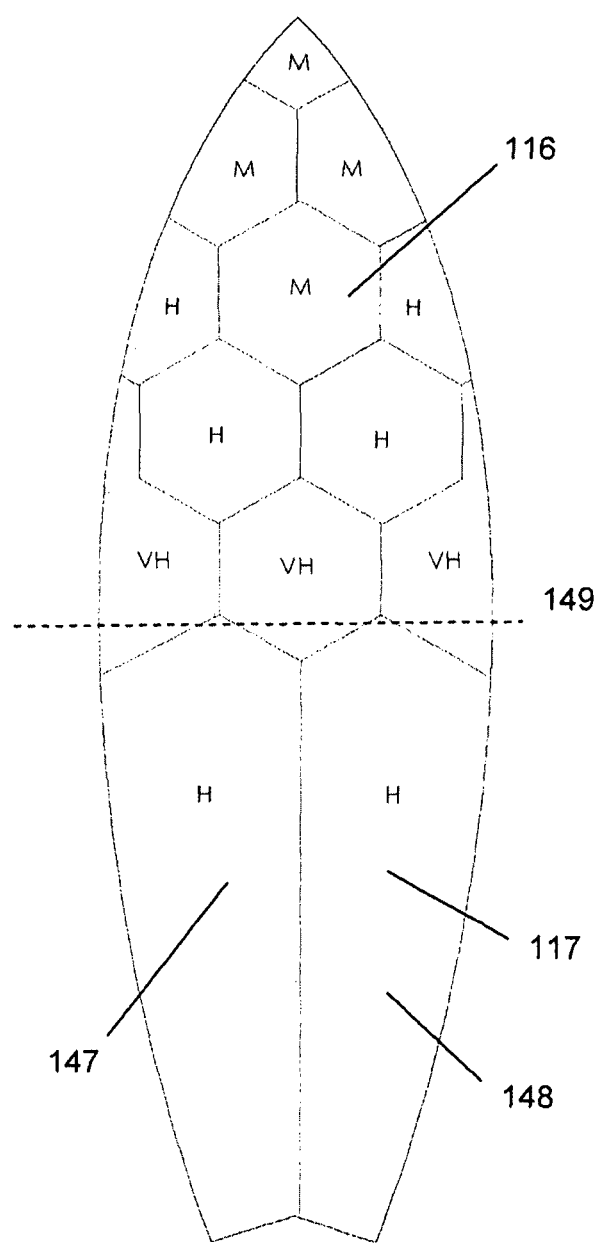
FIG. 17 is a plan view of a surfboard blank in accordance with a preferred embodiment of the present invention, the blank comprising a tessellated portion including tiles of various densities but each one being the same initial shape as the others, and a solid portion comprising a plurality of elongate plates disposed behind a transverse midline.
Figure 18:
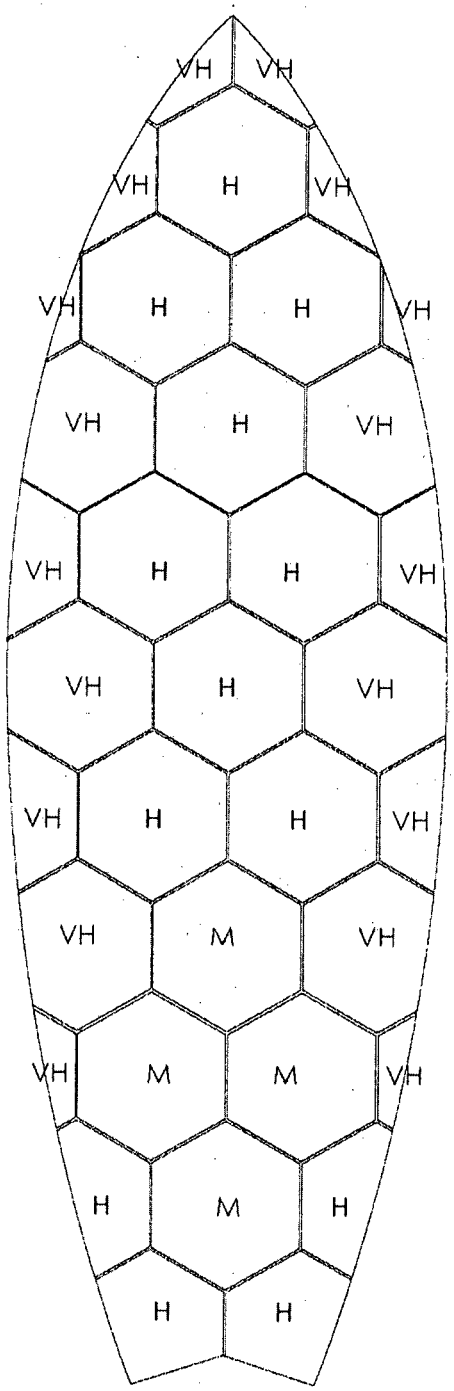
FIG. 18 is a plan view of a surfboard blank in accordance with a preferred embodiment of the present invention, the blank being fully tessellated with a selected flex signature, the flex being responsive to a substantially annular ring adjacent the blank rail of Very Hard (as hereindefined) foam tiles; some less dense tiles disposed inward of the ring, and the least dense tiles of the board disposed in a back region where one foot is supported.
Figure 19:
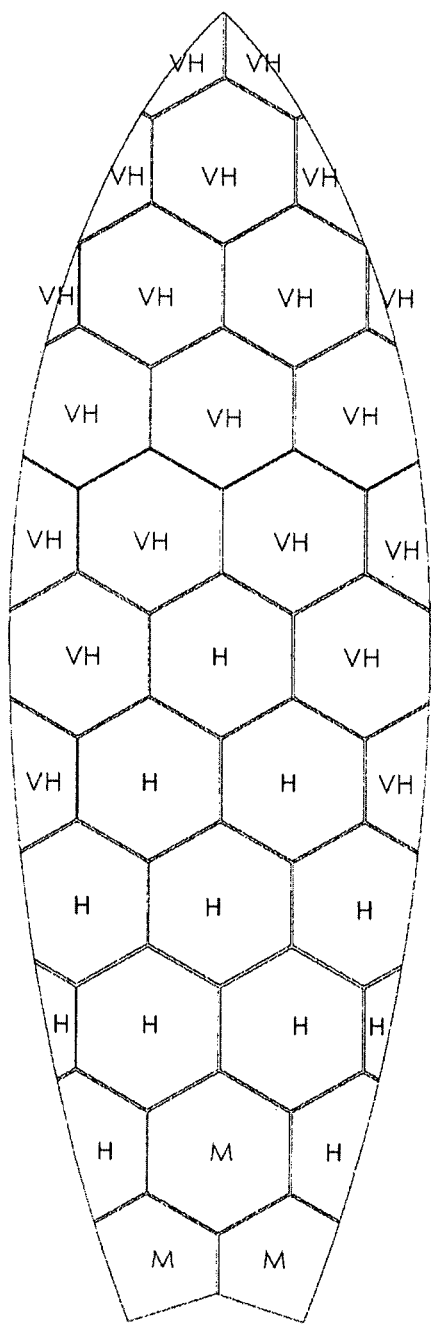
FIG. 19 is a plan view of a surfboard blank in accordance with a preferred embodiment of the present invention, the blank being similar to FIG. 14 except it is fully tessellated, the flex of the blank being responsive to a plurality of Very Hard tiles in a front half of the blank.
Figure 20:
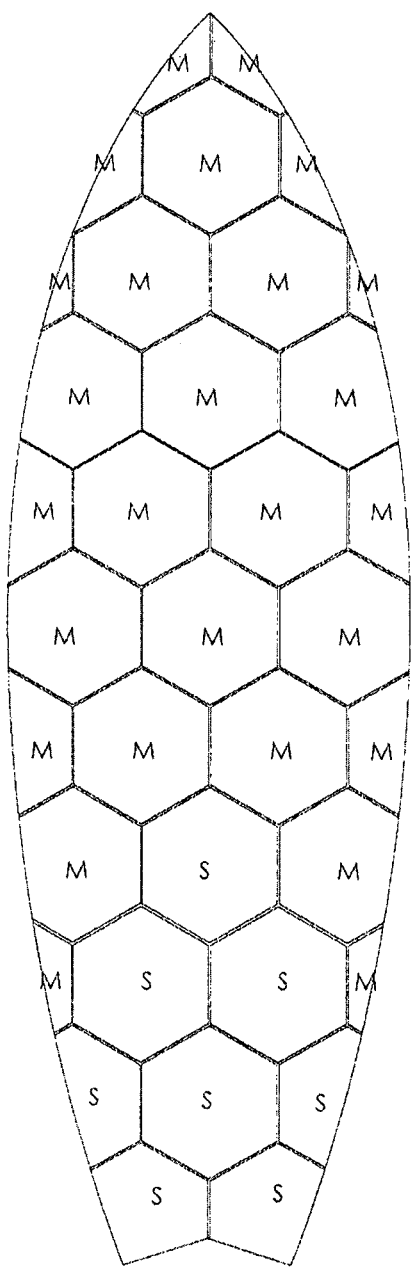
FIG. 20 is a plan view of a surfboard blank in accordance with a preferred embodiment of the present invention, the blank being fully tessellated with a selected flex signature, the flex of the blank being responsive to a plurality of Medium Density tiles over almost the entire blank, coupled with a plurality of Soft (or very low density) tiles disposed at the tail of the blank, softening the edge feel.
Figure 21:
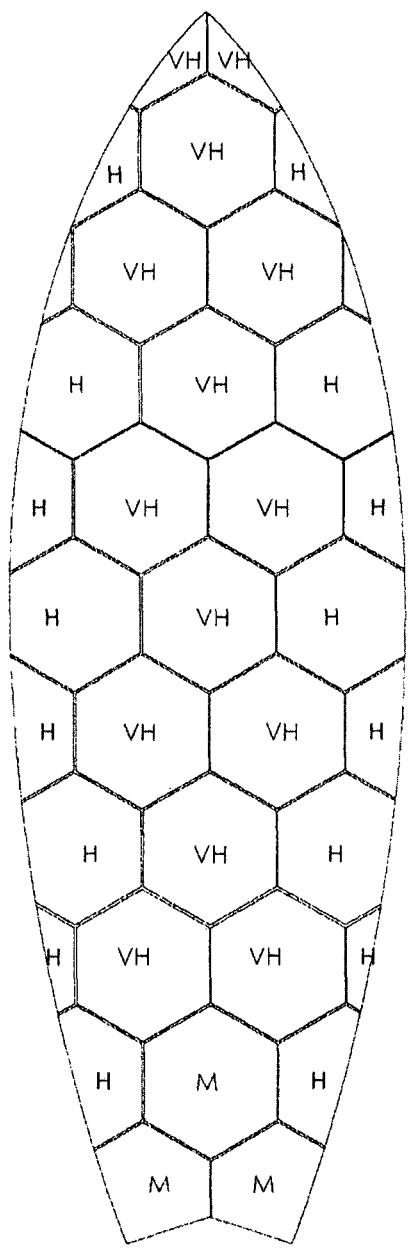
FIG. 21 is a plan view of a surfboard blank in accordance with a preferred embodiment of the present invention, the blank being fully tessellated with a selected flex signature, the flex of the blank being responsive to the highest density tiles being disposed along the centreline of the blank.
Figure 22:
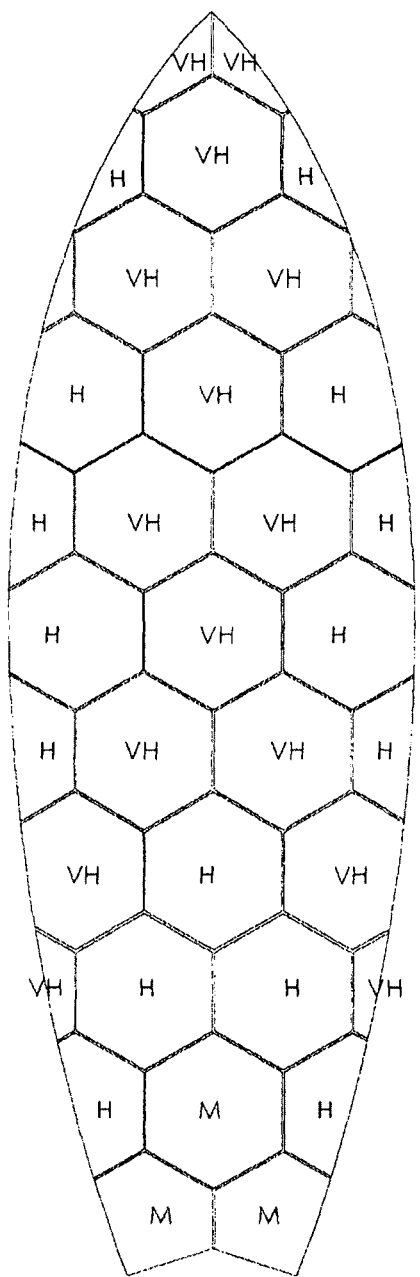
FIG. 22 is a plan view of a surfboard blank in accordance with a preferred embodiment of the present invention, the blank being fully tessellated with a selected flex signature, the flex of the blank being responsive to a plurality of Very Hard (as hereindefined) foam tiles in a forward region of the blank, and only disposed in rail regions toward the rear, while lower density tiles are disposed in the remaining region of the tail.
Figure 23:
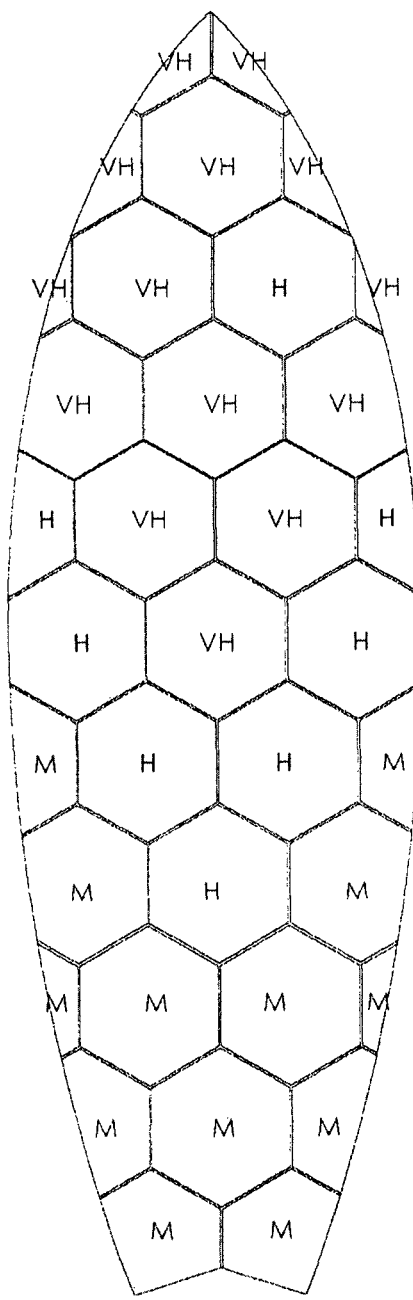
FIG. 23 is a plan view of a surfboard blank in accordance with a preferred embodiment of the present invention, the blank being fully tessellated with a selected flex signature, the flex being responsive to an asymmetrical arrangement of tiles having varying densities.
Figure 24:
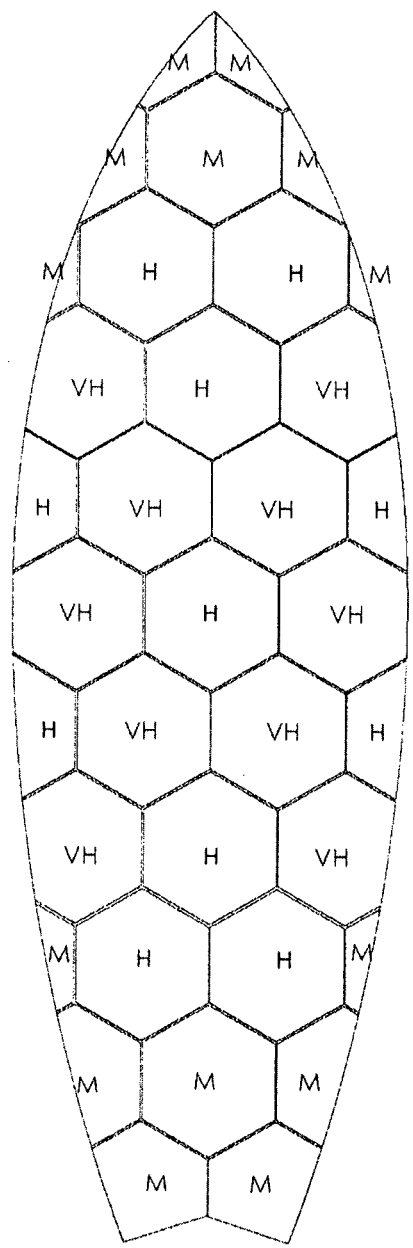
FIG. 24 is a plan view of a surfboard blank in accordance with a preferred embodiment of the present invention, the blank being fully tessellated with a selected flex signature, the flex being responsive to an arrangement of tiles wherein Very High density tiles are disposed in a central ring about a centre portion of the board, surrounding a lower density tile, and other lower density tiles are disposed in positions near the rail of the blank.
Figure 25:
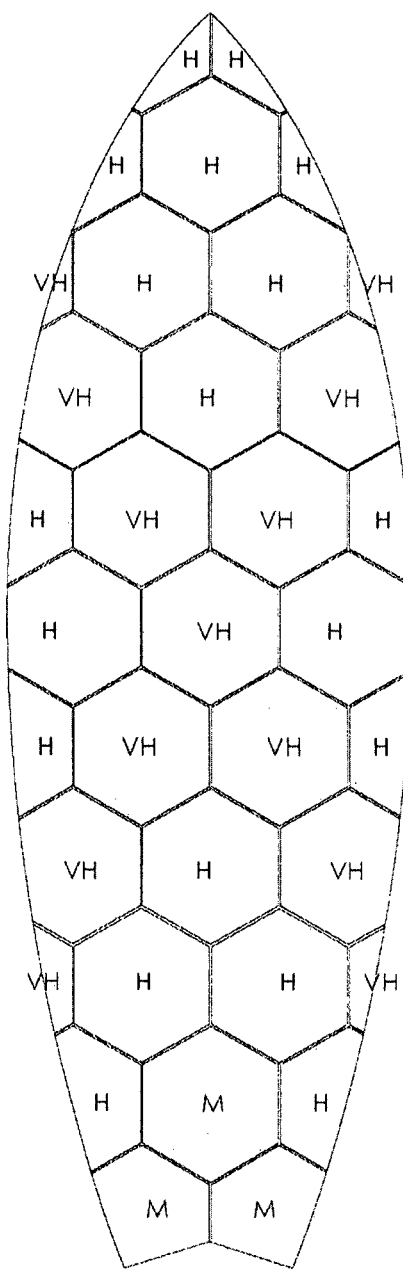
FIG. 25 is a plan view of a surfboard blank in accordance with a preferred embodiment of the present invention, the blank being fully tessellated with a selected flex signature, the tessellations being similarly arranged to the arrangement in FIG. 1.

In FIGS. 14, 16 and 17 there is a tessellated portion 116, but the remainder of the board is comprised of elongate structural element plates, in this case EPS blank plates 117.

The plates (and the solid blank portion) 117 are shaped in plan view to fit in with the hexagonal edges of the tessellated portion but are longer and/or broader than the hexagonal structural elements so that the stiffness/flex characteristic of the board is different from that of a fully tessellated board. That is, a long plate or solid plate provides more flexibility in that portion of the board than a tessellated portion, all other things being equal (such as density).

It can be seen that the plates 117 can also be made of various differing densities. In FIG. 17 both the elongate plates are made of High density. Some of the side plates 147 and 148 are also of an irregular nature to fit in with the hexagonal jagged edge of the tessellated portion. A transverse line 149, generally across a mid portion of the blank, is shown in some of the Figures to show a demarcation between some arrangements of tessellated regions 116 and plate regions which have one or more plates 117.

In FIG. 16, a central elongate plate 117 is constructed from Very High density (as hereindefined) foam, while two outer elongate plates 137 and 138 are constructed from High density (as hereindefined) foam. This provides a certain twist and strength signature.

FIG. 14 has a similar arrangement but the elongate plates 137 and 138 are constructed from Medium density (as hereindefined) foam and are disposed rearwardly of the centre line 149. Also, a tessellation of tiles is formed at the nose end from Very High density material. The central rear elongate plates are constructed from High density (as hereindefined) foam.

Other preferred embodiments include a plurality of Very Hard (as hereindefined) structural elements arranged in an X-shape. Medium density (as hereindefined) structural elements are disposed between the arms of the X-shape and Super Light density (as hereindefined) elements are disposed at one or more ends.

Foam of selected densities provides a structure such as for example a board with a selected flexibility. So it can be seen that, advantageously, various combinations of densities can be deployed and distributed across a board in accordance with a preferred embodiment of the present invention in varying ways in order to create a board with a selectable and suitable flex signature. Volume and flex can both be packed into parts of a board where previously this combination of features was not possible.

Some other combinations are made possible by the construction of preferred embodiments of the present invention, so as to increase the appeal and/or performance of watercraft. Some tiles may be completely transparent, or may be constructed from a hollow polymer box, so that the board rider may see underneath the board while riding the board along the surface of a body of water. Some tiles may be omitted altogether, and a sheet of clear plastic may be extended across the top and bottom of the blank to seal the board. Some tiles may be omitted and then a simple hole could be introduced, and the walls of the hole sealed to allow water to pass from one side of the board to the other. Some tiles could be made a different colour, so as to indicate where the Very High density tiles are, and where the other tiles are disposed on the blank. This increases the trust between rider and board, and the visual appeal of the board to the rider.

To manufacture the structural blank, a plurality of tiles may be assembled so as to abut or interconnect with adjacent tiles. A customised flex signature may be provided by the arrangement of various types of tiles having different densities as shown in the Figures. The tiles may then be glued together to form a blank.

To glue the tiles together a press is utilised to hold the foam in position while the glue sets and to provide a sufficient force to hold the tiles together while the glue sets. The top and bottom plates of the press which face the foam include recesses so that the tiles are held in a selected arrangement and are inhibited from movement while the glue sets.

The blank may then be shaped by a shaper's cutting, sanding, hollowing, or other method to form a suitable board of a suitable performance characteristic, tuned for speed, stability, or manoeuvrability, or flex. Fibreglass matting and resin and fin boxes are then applied to the outside of the blank so as to form a finished watertight board.

To manufacture several structural blanks at once, all having the same flex performance characteristic, pylons of each structural element are placed alongside one another and glued together. For example, a hexagonal-cross-section pylon would be connected to another similarly-shaped pylon. Some would be of density different to others, just as the tiles were. The only difference is in the depth of the tile-the pylon can be thought of as a very thick tile. Once a very thick block has been assembled this way, sheets or plates of blank can be sliced from the block to form blanks, which can then be shaped to form a board in conventional ways.

Modifications and improvements to the invention will be readily apparent to those skilled in the art. Such modifications and improvements are intended to be within the scope of this invention.

What is claimed is:

1. A watercraft structural blank comprising:
   a plurality of structural foam tile elements in at least a portion of the watercraft structural blank, the plurality of structural foam tile elements extending a full thickness of the watercraft structural blank and connected to one or more adjacent structural foam tile elements at an edge portion of each structural foam element to form a tessellated matrix of structural foam tile elements,
   wherein the plurality of structural foam tile elements comprises two or more different types of structural foam tile elements, differing in density such that when one type of structural foam tile element is of a selected density range then another type of structural foam tile element is of a different density range; and
   wherein the watercraft structural blank is adapted to be shaped to form a watercraft.

2. The watercraft structural blank in accordance with claim 1 wherein the structural foam tile elements are regular or irregular and distributed in a regular or irregular matrix to form the tessellated structural portion or a whole tessellated structural blank.

3. The watercraft structural blank in accordance with claim 2 including a tessellated portion across about a first half thereof and a solid portion comprising a second half thereof.

4. The watercraft structural blank in accordance with claim 1 wherein the different types of structural foam tile element differ in shape, rigidity, colour, opacity or material.

5. The watercraft structural blank in accordance with claim 1 wherein the structural foam tile elements are in a hexagonal, octagonal, square, rectangular, pentagonal, dodecahedron, diamond, rhomboidal, parallelogram, circular, oval or double convex shape.

6. The watercraft structural blank in accordance with claim 1 wherein the different types of structural foam tile elements include up to four different types of structural foam tile elements.

7. The watercraft structural blank in accordance with claim 1 wherein the structural foam tile element types are selected from:
   a first type of structural foam tile element having a first density designated as Super Lite, having a in a range of about 10-20 kg/m3;
   a second type of structural foam tile element tile having a second density designated as Medium, having a density in a range of about 15-25 kg/m3;
   a third type of structural foam tile element having a third density designated as Hard, has a density of about 23 kg/m3; and
   a fourth type of structural foam tile element having a fourth density designated as Very Hard, has a density in a range of about 25-40 kg/m3.

8. The watercraft structural blank in accordance with claim 7 wherein a plurality of Very Hard structural foam tile elements are disposed adjacent one another in a group generally forward of a transverse midline on the watercraft structural blank.

9. The watercraft structural blank in accordance with claim 7 wherein a Very Hard structural foam tile element is disposed generally forward of a transverse midline on the watercraft structural blank, and a plurality of different structural foam tile element types are disposed aft of the transverse midline.

10. The watercraft structural blank in accordance with claim 1 wherein the material of each structural foam tile element is Expanded Polystyrene foam or polyurethane foam.

11. The watercraft structural blank in accordance with claim 1 wherein each structural foam tile element has a length between 100 mm and 400 mm across the structural foam tile element.

12. The watercraft structural blank in accordance with claim 1 wherein structural foam tile elements are joined to one another with adhesive.

13. The watercraft structural blank in accordance with claim 1 wherein the portion of the watercraft structural blank comprises three different densities of structural foam tile element.

14. The watercraft structural blank in accordance with claim 1 wherein the structural foam tile elements are arranged so that a plurality of one type of structural foam tile element is disposed adjacent structural elements of the same type in an X-shape across the watercraft structural blank, or are disposed substantially adjacent or along a centreline of the watercraft structural blank, or are disposed in discrete groups adjacent foot support areas on the watercraft structural blank.

15. A surfboard including a watercraft structural blank in accordance with claim 1, and further including an outer skin.

16. The watercraft structural blank in accordance with claim 1, for a watercraft selected from the group consisting of surfboards, stand-up paddleboards, bodyboards, kneeboards, skimboards, kiteboards, and wakeboards.

17. The watercraft structural blank in accordance with claim 16, wherein the watercraft is a surfboard.

* * * * *